June 10, 1924.

D. E. BATTY 1,497,475

SPEED REGULATING DEVICE FOR ELECTRICALLY DRIVEN VEHICLES

Filed June 1, 1922   3 Sheets-Sheet 1

INVENTOR.
Dudley Eugene Batty
Byrnes, Stebbins & Parmelee
his attys

June 10, 1924.   1,497,475
D. E. BATTY
SPEED REGULATING DEVICE FOR ELECTRICALLY DRIVEN VEHICLES
Filed June 1, 1922   3 Sheets-Sheet 2

INVENTOR.

June 10, 1924.  
D. E. BATTY  
1,497,475  
SPEED REGULATING DEVICE FOR ELECTRICALLY DRIVEN VEHICLES  
Filed June 1, 1922  3 Sheets-Sheet 3
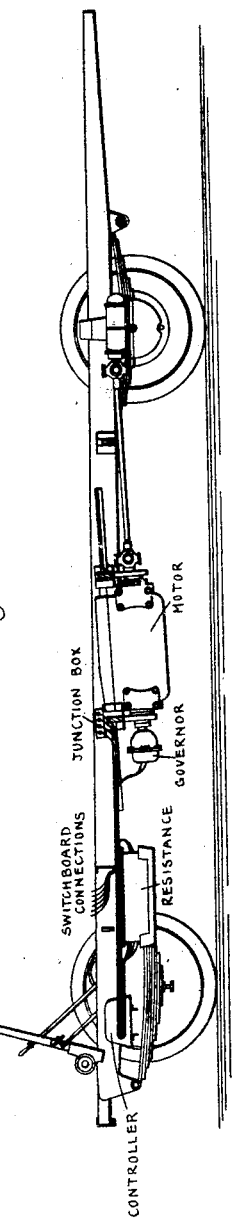

Patented June 10, 1924.

1,497,475

UNITED STATES PATENT OFFICE.

DUDLEY EUGENE BATTY, OF WEST KENSINGTON, LONDON, ENGLAND, ASSIGNOR TO THE ASSOCIATED EQUIPMENT COMPANY LIMITED, OF WESTMINSTER, LONDON, ENGLAND, A BRITISH COMPANY.

SPEED-REGULATING DEVICE FOR ELECTRICALLY-DRIVEN VEHICLES.

Application filed June 1, 1922. Serial No. 565,246.

*To all whom it may concern:*

Be it known that I, DUDLEY EUGENE BATTY, a subject of the King of England, residing at West Kensington, London, England, have invented certain new and useful Improvements in Speed-Regulating Devices for Electrically-Driven Vehicles, of which the following is a specification.

This invention is for improvements in or relating to speed regulating devices for electrically driven vehicles, and has for one of its objects to provide for an increased vehicle speed in some circumstances. As is well known, electrically driven vehicles have certain advantages over petrol driven or like vehicles, but they are subject to the relative disadvantage that their top speed is usually less than that of the other type of vehicle. For a given torque curve and with a given vehicle load the maximum speed of an electrically driven vehicle depends upon the gear ratio and the gradient being traversed. Change speed gear is not usually employed on electrically driven vehicles. Hence in circumstances favourable to a higher vehicle speed this cannot be obtained with an electrically driven vehicle, unless the field strength of the motor is regulated. Such regulation can be effected by shunting the field in a series-wound motor or cutting in an extra series resistance in a shunt-wound or compound motor. It has been proposed to do this manually at the will of the vehicle driver, but this is not satisfactory as it allows the driver to reduce the field strength at a time when it is necessary that the strength should be maintained at its highest possible figure.

Another object of the present invention is to increase the rate of acceleration in the speed of the vehicle in addition to increasing its maximum speed.

According to the primary feature of the present invention there is provided a speed regulating device for electrically driven vehicles comprising in combination regulating means for varying the ratio of the current passing through the armature to that passing through the field winding by weakening the field, a governor driven by the armature-shaft, an electromagnetically-operated switch arranged to bring the regulating means into and out of operation, and a controlling switch controlled by said governor, and arranged to close and open the energizing circuit of said electromagnetically-operated switch respectively according as the rotation of said shaft exceeds or falls below a predetermined speed. Thus, when the armature shaft is rotating at a speed above the predetermined figure the field strength of the motor will be automatically reduced and permit the vehicle to accelerate more quickly and to reach a higher maximum speed than would otherwise be the case. To avoid damage to the motor, the aforesaid regulating means are preferably also controlled by an automatic safety device which is operatively connected to the motor and operates at a predetermined overload figure for the latter to bring the said regulating means out of operation.

Other features of the invention relate to the construction and arrangement of the regulating means and to their control by the governor and by other parts of the mechanism.

For a more complete understanding of the invention there will now be described, by way of example only and with reference to the accompanying drawings, certain embodiments of the invention, but it is to be understood that the invention is not limited to the precise details set forth.

In these drawings:—

Figure 5 is a side elevation of a vehicle equipped with my system of control.

Like reference numerals indicate like parts throughout the drawings.

Figure 1:
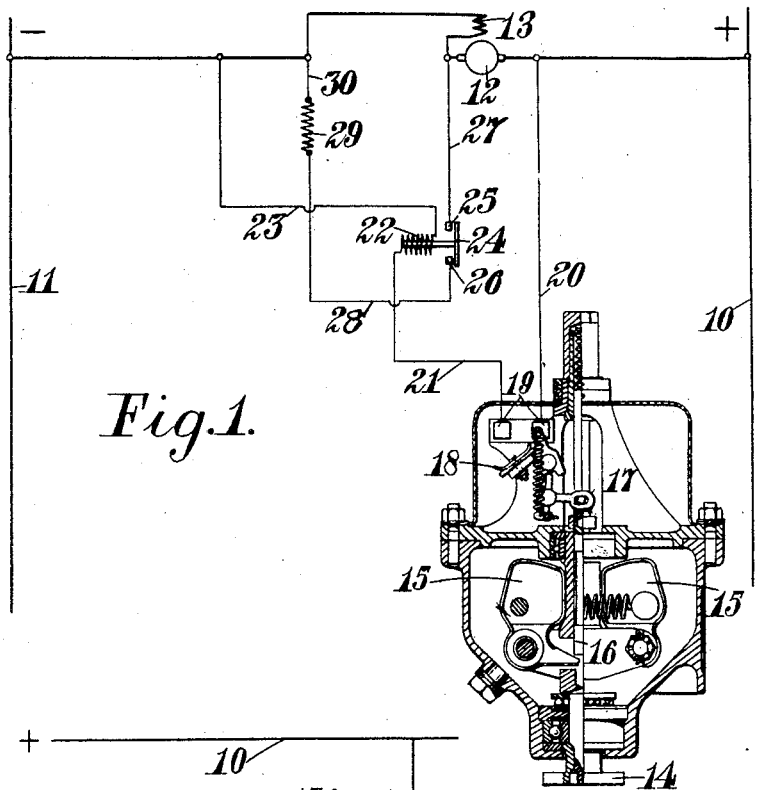
Figure 1 shows one arrangement of the wiring in applying the invention to a series-wound motor. This figure also shows a suitable form of governor for controlling the regulating means.

Referring firstly to Figure 1, the main leads are shown at 10 and 11. The armature of the motor is illustrated at 12 and the field winding at 13, these two being arranged in series. The governor spindle 14 is driven in any suitable way by the armature shaft and its weights 15 control a longitudinally movable member 16. The member 16 by means of a lever 17 controls a switch 18 whereof the contact points are shown at 19. When, therefore, the speed of the spindle 14 becomes sufficiently high the switch bridges the contacts 19. One contact is connected by a lead 20 to the positive main and the other by a lead 21 to one end of a magnet winding 22. The other end of this magnet winding is connected by a lead 23 to the negative main. The magnet winding 22 controls a switch 24 having co-operating contact points 25 and 26. The former is connected by a lead 27 to one end of the field winding 13, and the other contact point 26 is connected by a lead 28 to one end of a resistance 29, the other end of which is connected to the second end of the field winding by a lead 30.

The operation of the mechanism will be apparent. When the governor closes the switch points 19, the magnet winding 22 will cause the switch points 25 and 26 to be bridged, thereupon bringing in the shunt resistance 29 into parallel with the field winding 13, the whole operation being quite automatic.

Figure 2:
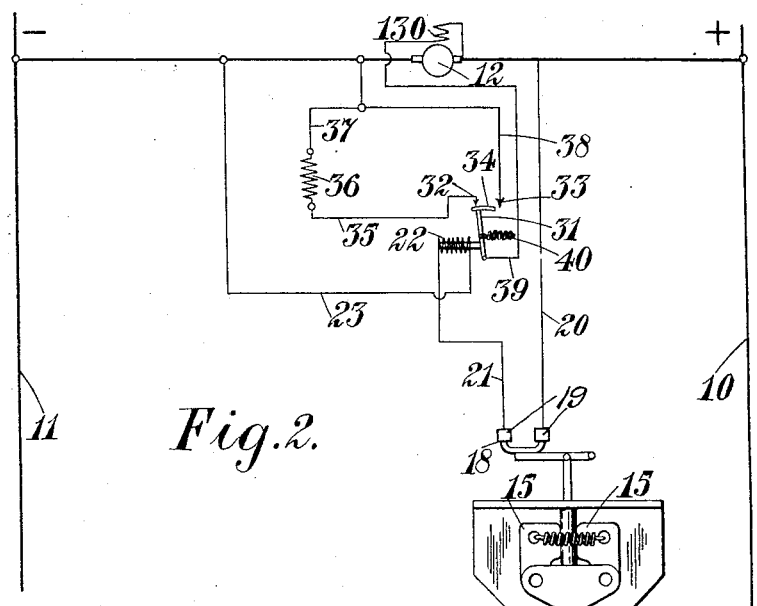
Figure 2 is a view somewhat similar to Figure 1 showing one arrangement of wiring for a shunt-wound motor. In this figure the governor is shown more or less diagrammatically.

In the arrangement shown in Figure 2, the magnet winding 22 operates a switch 31 which co-operates with contact points 32 and 33 by means of an enlarged head 34. The contact point 32 is connected by a lead 35 to one end of a resistance 36, the other end of which is connected by a lead 37 to the negative main. The contact 33 is connected by a lead 38 to the negative main also and the pivot of the switch 31 is connected by a lead 39 to one end of the field winding 130. The switch is normally maintained in contact with the member 33 by a spring 40, but when the governor closes the contact points 19, the magnet winding 22 draws the switch across into engagement with the contact point 32 thus bringing into series with the field winding 130 the resistance 36. The head 34 of the switch 31 is big enough to ensure that before it leaves the contact point 33 it shall have made contact with the point 32.

Figure 3:
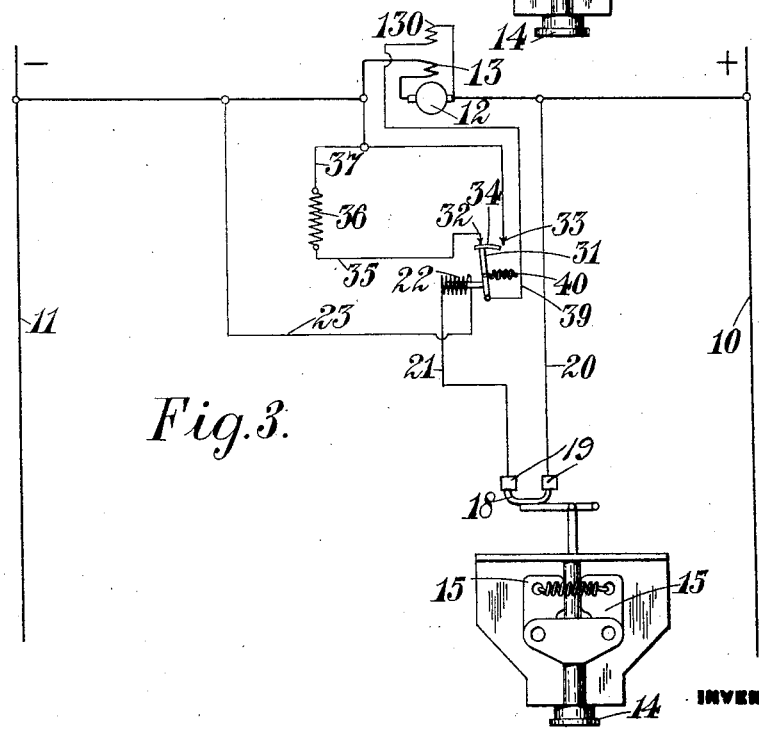
Figure 3 is a view somewhat similar to Figure 1 showing one arrangement of wiring for a compound-wound motor. In this figure the governor, as in Figure 2, is shown more or less diagrammatically.

The arrangement shown in Figure 3 is identical with that shown in Figure 2 with the exception that the motor has both a series winding 13 and a shunt winding 130. The resistance 36 is brought into series with the latter by the operation of the governor.

Figure 4:
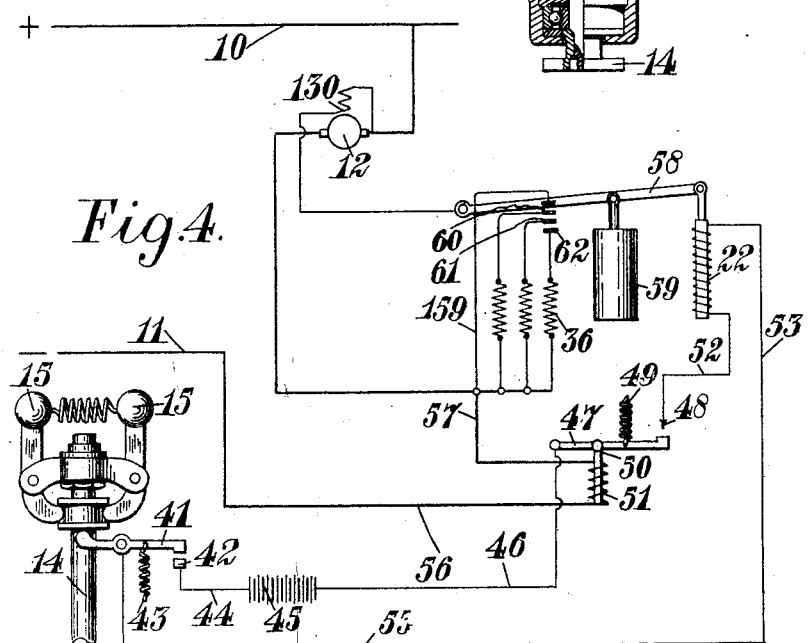
Figure 4 is a view somewhat similar to Figure 2, but showing a modified arrangement of wiring for a shunt-wound motor. In this figure also a modified form of governor is illustrated.

Referring now to Figure 4, as already stated, a different form of governor is illustrated but it will be understood that the governor may be of any type, either mechanical or electrical. In the constructions already described, the governor controls the regulating means, through an operating circuit which includes a solenoid, viz, the magnet winding 22. This arrangement is also adopted in Figure 4 in which the governor controls a switching member 41 which is closed against a contact 42 by a spring 43 when the speed of the armature shaft rises sufficiently high. The contact 42 is connected by a lead 44 to a source of current 45 and this is in turn connected by a lead 46 to a switching member 47. The member 47 is normally maintained in contact with a contact point 48 by a spring 49 but it is provided with an extension 50 which is controlled by a magnet winding 51 for a purpose now to be indicated. The contact point 48 is connected by a lead 52 to one end of the magnet winding 22, the other end of which is connected by a lead 53 to the switch 41. The lead 53 is shown as including a switch 54 with a co-operating contact point 55. This switch 54 is arranged only to be closed when the driver's controlling lever governing the supply of current to the motor is in its "full on" position. This will prevent mishandling of the driving gear for the vehicle and possible damage to the motor. One end of the magnet winding 51 is connected by a lead 56 to the negative main 11 and the other end of this magnet winding is connected by a lead 57 to one end of the motor armature 12, the other end of which is connected to the positive main 10. The switch 47 thus constitutes an automatic make-and-break overload switch. This automatic safety device will cut the magnet winding 22 out of operation should a predetermined overload become operative.

The regulating means in the construction shown in Figure 4 include a switch 58 controlled by a dashpot 59. This switch is operated by the magnet winding 22 and the dashpot 59 ensures that it shall only work slowly and moreover the time which it takes to operate shall be under control by regulating the dashpot. When the magnet winding 22 is inoperative the switch 58 is connected by a lead 159 to the lead 57, but as the switch 58 is operated by the magnet winding, the amount by which the field strength is weakened is progressively increased by the switch 58 reaching the contact points 60, 61 and 62, each of which brings in a different resistance 36, it being understood that the arrangements are such that when the switch reaches the contact point 60 it breaks contact with the lead 159.

In Figure 4 the progressive increase in the weakening of the field strength is shown in connection with a shunt-wound motor but it will be obvious that it can also be applied to a series-wound or a compound-wound motor. Moreover, of course, the driver's switch 54 and the overload switch 47 could also be incorporated in the other embodiments of the invention.

The invention is particularly applicable to electrically driven trolley omnibuses but is not limited to such vehicles as it is also applicable to tramways, railways and the like.

I claim:

1. A speed-regulating device for the electric motor of an electrically-driven vehicle, comprising in combination regulating means for varying the ratio of the current passing through the armature to that passing through the field winding by weakening the field, a governor driven by the armature-shaft, an electromagnetically-operated switch arranged to bring the regulating means into and out of operation, and a controlling switch controlled by said governor, and arranged to close and open the energizing circuit of said electromagnetically-operated switch respectively according as the rotation of said shaft exceeds or falls below a predetermined speed.

2. A speed-regulating device for a motor provided with a shunt field-winding for an electrically driven vehicle, comprising in combination regulating means including a resistance for varying the ratio of the current passing through the armature to that passing through the shunt winding by weakening the field, a governor driven by the armature-shaft, an electromagnetic relay arranged, when energized, to connect said resistance in series with said shunt winding and, when de-energized, to disconnect the same from the said shunt winding, and a switch controlled by said governor and arranged to close and open the energizing circuit of said relay respectively according as the rotation of the said shaft exceeds or falls below a predetermined speed.

3. A speed-reguating device for the electric motor of an electrically-driven vehicle, comprising in combination regulating means for varying the ratio of the current passing through the armature to that passing through the field winding by weakening the field, a governor driven by the armature-shaft, an electromagnetically-operated switch arranged to bring the regulating means into and out of operation, a controlling switch controlled by said governor and arranged to close and open the energizing circuit of said electromagnetically-operated switch respectively according as the rotation of said shaft exceeds or falls below a predetermined speed, and an automatic safety device controlling the circuit connections of said electromagnetically-operated switch and arranged to operate at a predetermined overload to open said switch and bring the regulating means out of operation.

4. A speed-regulating device for the electric motor of an electrically-driven vehicle, comprising in combination regulating means for varying the ratio of the current passing through the armature to that passing through the field winding by weakening the field, a governor driven by the armature-shaft, an electromagnetically-operated switch arranged to bring the regulating means into and out of operation, a controlling switch controlled by said governor and arranged to close and open the energizing circuit of said electromagnetically-operated switch respectively according as the rotation of said shaft exceeds or falls below a predetermined speed, and a second controlling switch arranged to close and open the energizing circuit of said electromagnetically-operated switch independently of the first said controlling switch.

5. A speed-regulating device for the electric motor of an electrically-driven vehicle, comprising in combination regulating means for varying the ratio of the current passing through the armature to that passing through the field winding by weakening the field, a governor driven by the armature-shaft, an electromagnetically-operated switch arranged to bring the regulating means into and out of operation, a controlling switch controlled by said governor and arranged to close and open the energizing circuit of said electromagnetically-operated switch respectively according as the rotation of said shaft exceeds or falls below a predetermined speed, an automatic safety device controlling the circuit connections of said electromagnetically-operated switch and arranged to operate at a predetermined overload to open said switch and bring the regulating means out of operation and a second controlling switch arranged to close and open the energizing circuit of said electromagnetically-operated switch independently of the first said controlling switch.

6. A speed-regulating device for the electric motor of an electrically driven vehicle, comprising in combination dash-pot controlled regulating means for varying the ratio of the current passing through the armature to that passing through the field winding by weakening the field, a governor driven by the armature-shaft, an electromagnetically-operated switch arranged to bring the regulating means into and out of operation, and a controlling switch controlled by said governor, and arranged to close and open the energizing circuit of said electro-magnetically-operated switch respectively according as the rotation of said shaft exceeds or falls below a predetermined speed.

In testimony whereof I have signed my name to this specification in the presence of two subscribing witnesses.

DUDLEY EUGENE BATTY.

Witnesses:
CHAS. K. EDWARDS,
LEONARD TOWERS.